(12) United States Patent
Rose, Sr.

(10) Patent No.: US 6,456,515 B1
(45) Date of Patent: Sep. 24, 2002

(54) THREE-PHASE H-BRIDGE ASSEMBLY AND METHOD OF ASSEMBLING THE SAME

(75) Inventor: Robert E. Rose, Sr., Fort Atkinson, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 49 days.

(21) Appl. No.: 09/723,359

(22) Filed: Nov. 27, 2000

(51) Int. Cl.[7] .............................................. H02M 1/00
(52) U.S. Cl. ...................................... 363/144; 363/141
(58) Field of Search .............................. 363/55, 56.01, 363/56.02, 141, 144, 147; 257/706, 707, 713; 361/704, 707, 709, 711, 712, 719

(56) References Cited

U.S. PATENT DOCUMENTS

| | | | |
|---|---|---|---|
| 4,599,680 A | 7/1986 | Gibson et al. | |
| 4,978,638 A | 12/1990 | Buller et al. | |
| 4,979,074 A | 12/1990 | Morley et al. | |
| 5,055,990 A | * 10/1991 | Miki et al. | ..................... 363/56 |
| 5,206,713 A | 4/1993 | McGeary | |
| 5,294,831 A | 3/1994 | Azar et al. | |
| 5,396,403 A | 3/1995 | Patel | |
| 5,400,220 A | 3/1995 | Swamy | |
| 5,438,479 A | 8/1995 | Heilbronner | |
| 5,473,511 A | 12/1995 | Reddy et al. | |
| 5,548,481 A | 8/1996 | Salisbury et al. | |
| 5,557,500 A | 9/1996 | Baucom et al. | |
| 5,623,399 A | * 4/1997 | Ishii et al. | .............. 363/141 X |
| 5,640,048 A | 6/1997 | Selna | |
| 5,644,837 A | 7/1997 | Fathi et al. | |
| 5,698,897 A | 12/1997 | Nashimoto et al. | |
| 5,754,402 A | 5/1998 | Matsuzaki et al. | |
| 5,790,379 A | 8/1998 | Kang | |
| 5,825,089 A | 10/1998 | Valenti et al. | |
| 5,847,951 A | 12/1998 | Brown et al. | |
| 5,870,290 A | 2/1999 | Chun et al. | |
| 5,892,279 A | 4/1999 | Nguyen | |
| 5,892,658 A | 4/1999 | Urda et al. | |
| 5,903,435 A | 5/1999 | Hsieh et al. | |
| 5,914,861 A | 6/1999 | Richter et al. | |
| 5,969,950 A | 10/1999 | Tantoush | |
| 5,982,622 A | 11/1999 | Chiou | |
| 6,020,649 A | 1/2000 | Watanabe et al. | |
| 6,049,975 A | 4/2000 | Clayton | |

* cited by examiner

Primary Examiner—Jessica Han
(74) Attorney, Agent, or Firm—Michael Best & Friedrich LLP

(57) ABSTRACT

The invention provides a bridge assembly for a three-phase motor. The assembly includes a first subassembly having a first terminal plate, a second subassembly having a second terminal plate, a third subassembly having a third terminal plate and a fourth subassembly having a bus terminal plate. Each of the terminal plates is electrically isolated from the other terminal plates, and at least one of the first, second, third and bus terminal plates acts as a heat sink. The assembly further includes first, second, third, fourth, fifth and sixth switching devices interconnected to at least one of the terminal plates. Each switching device has a heat generating surface in thermal communication with one of the first, second, third and bus terminal plates. The assembly further includes a fifth subassembly interconnected with the first, second, third, and fourth subassemblies.

29 Claims, 5 Drawing Sheets

THREE-PHASE H-BRIDGE ASSEMBLY AND METHOD OF ASSEMBLING THE SAME

BACKGROUND OF THE INVENTION

The present invention relates to a bridge assembly and, particularly, to a three-phase H-bridge assembly for a three-phase motor and a method of assembling the three-phase H-bridge assembly.

An inverter is a device or system that converts or changes a direct-current (DC) signal into an alternating-current (AC) signal. The inverter can be for a single-phase system or a polyphase system, such as a three-phase system. For a three-phase system, the inverter changes the DC signal into a three-phase AC signal. An exemplary use for a three-phase inverter is converting a twelve-volt DC signal generated by a battery (e.g., a vehicle battery) into a three-phase AC signal for powering a three-phase motor (e.g., a starting motor).

A rectifier is a device or system that changes an AC signal to a DC signal. The rectifier can also be for a single phase system or a polyphase system, such as a three-phase system. An exemplary use for a three-phase rectifier is converting a three-phase AC signal from a generator or electrical power station into a twelve-volt DC signal for charging a battery (e.g., a vehicle battery).

SUMMARY OF THE INVENTION

The invention provides a three-phase H-bridge assembly of an inverter/rectifier. The inverter/rectifier is used in connection with a three-phase motor/generator, and includes a controller that controls the three-phase H-bridge assembly. The three-phase H-bridge assembly includes a three-phase H-bridge circuit. The controller controls the H-bridge circuit resulting in either a DC signal being converted to a three-phase AC signal or a three-phase AC signal being converted to a DC signal.

For example, the inverter/rectifier may be used in connection with a vehicle. The inverter/rectifier may convert a twelve-volt DC signal from a vehicle battery into a three-phase AC signal, which is provided to a three-phase motor for starting the vehicle engine. In addition, the inverter/rectifier may receive a three-phase AC signal from the motor, which is acting as a generator, and convert the signal into a twelve-volt DC signal for charging the battery. Of course, the inverter/rectifier may be used only as an inverter or only as a rectifier. For the remainder of the application and for the claims, the term "inverter" implies an inverter, an inverter/rectifier, or even a rectifier.

The three-phase H-bridge assembly includes a first subassembly having a first terminal plate, a second subassembly having a second terminal plate, a third subassembly having a third terminal plate, and a fourth subassembly having a bus terminal plate. Each terminal plate includes a terminal acting as a connector capable of receiving a conductor. The first, second, and third terminal plates generate or receive one phase of the three-phase signal, and the bus terminal plate generates or receives one potential of the DC signal. Additionally, each terminal plate is electrically isolated from the other terminal plates.

The three-phase H-bridge assembly further includes first, second, third, fourth, fifth and sixth switching devices interconnected with at least one of the first, second, third and bus terminal plates. The first, second, third and bus terminal plates act as a heat sink for the switching devices connected thereto. In a preferred embodiment, the first switching device is interconnected with the first plate, the second switching device is interconnected with the second plate, the third switching device is interconnected with the third plate, and the fourth, fifth and sixth switching devices are interconnected with the bus terminal plate. However, in other embodiments, the switching devices may be interconnected with the plates differently (e.g., all six switching devices are mounted on the bus terminal plate).

The three-phase H-bridge assembly further includes a fifth subassembly having a bus board, and one or more fasteners. The subassemblies are retained in the three-phase H-bridge assembly by the one or more fasteners. In one embodiment, the bus board has a non-conductive material or surface on one side and a conductive material or surface on the other side. The conductive material acts as a ground plane and includes a terminal that generates or receives the second potential of the DC signal. For the preferred embodiment, the fastener interconnects the six switching devices with the bus board.

One feature of the invention has at least one of the first, second, third and bus terminal plates acting as a heat sink and, preferably, each of the first, second, third and bus terminal plates acting as a heat sink. That is, each switching device has a thermally conductive surface in thermal contact with a plate, and the plate acts as a heat sink for transferring thermal energy. Consequently, the plate has a dual purpose of acting as a terminal and as a heat sink. In addition, if the plate has too much thermal energy, a portion of the thermal energy may be transferred through the terminals and into the windings of the motor.

In one embodiment of the invention, the three-phase H-bridge assembly include seventh, eight, ninth, tenth, eleventh and twelfth switching devices. The first and seventh switching devices are electrically connected in parallel and are mounted on the first plate, the second and eighth switching devices are electrically connected in parallel and are mounted on the second plate, the third and ninth switching devices are electrically connected in parallel and are mounted on the third plate, the fourth and tenth switching devices are electrically connected in parallel and are mounted on the bus terminal plate, the fifth and eleventh switching devices are electrically connected in parallel and are mounted on the bus terminal plate, and the sixth and twelfth switching devices are electrically connected in parallel and are mounted on the bus terminal plate.

If the switching device are rated similarly and the multiple switching devices are connected in parallel, then the inverter circuit allows a greater current flow through the three-phase H-bridge assembly than if the three-phase H-bridge assembly did not include multiple switching devices connected in parallel. However, the increased current flow increases the amount of heat that needs to be removed. By mounting the switching devices on the terminal plates of the invention, the terminal plates can readily transfer the heat directly to the air, or transfer the heat into the windings of the motor.

The invention further provides a method of assembling a three-phase H-bridge assembly for a three-phase motor. The method includes forming first, second, third and fourth subassemblies. The first subassembly includes a first terminal plate, the second subassembly includes a second terminal plate, the third subassembly includes a third terminal plate, and the fourth subassembly includes a bus terminal plate. The forming step includes temporarily mounting the first, second, third and bus terminal plates to a mounting structure, mounting a first switching device to one of the first, second, third, and bus terminal plates, mounting a second switching device to one of the first, second, third, and bus terminal plates, mounting a third switching device to one of the first, second, third, and bus terminal plates, mounting a fourth switching device to one of the first, second, third, and bus terminal plates, mounting a fifth switching device to one of the first, second, third, and bus terminal plates, and mounting a sixth switching device to one of the first, second, third, and bus terminal plates. Preferably, the first switching device is mounted on the first plate, the second switching device is mounted on the second plate, the third switching device is mounted on the third plate, and the fourth, fifth and sixth switching device are mounted on the bus.

The method further includes interconnecting the first, second, third and fourth subassemblies with a fifth subassembly, and removing the first, second, third and fourth subassemblies from the mounting structure.

Other features and advantages of the invention will become apparent from the detailed description and accompanying drawings.

DETAILED DESCRIPTION

Figure 1:
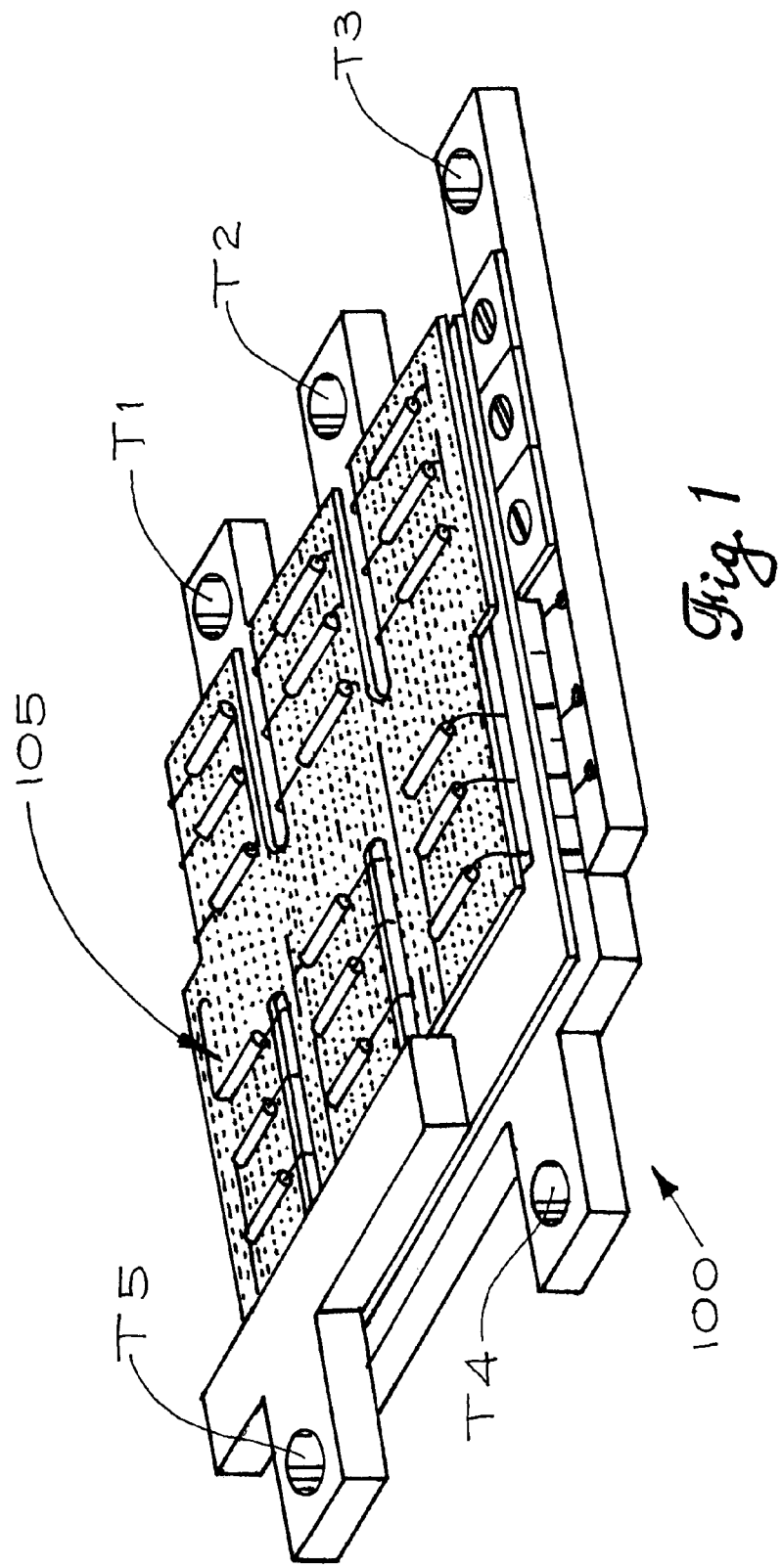
FIG. 1 is a perspective view of an three-phase H-bridge assembly of the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

Figure 2:
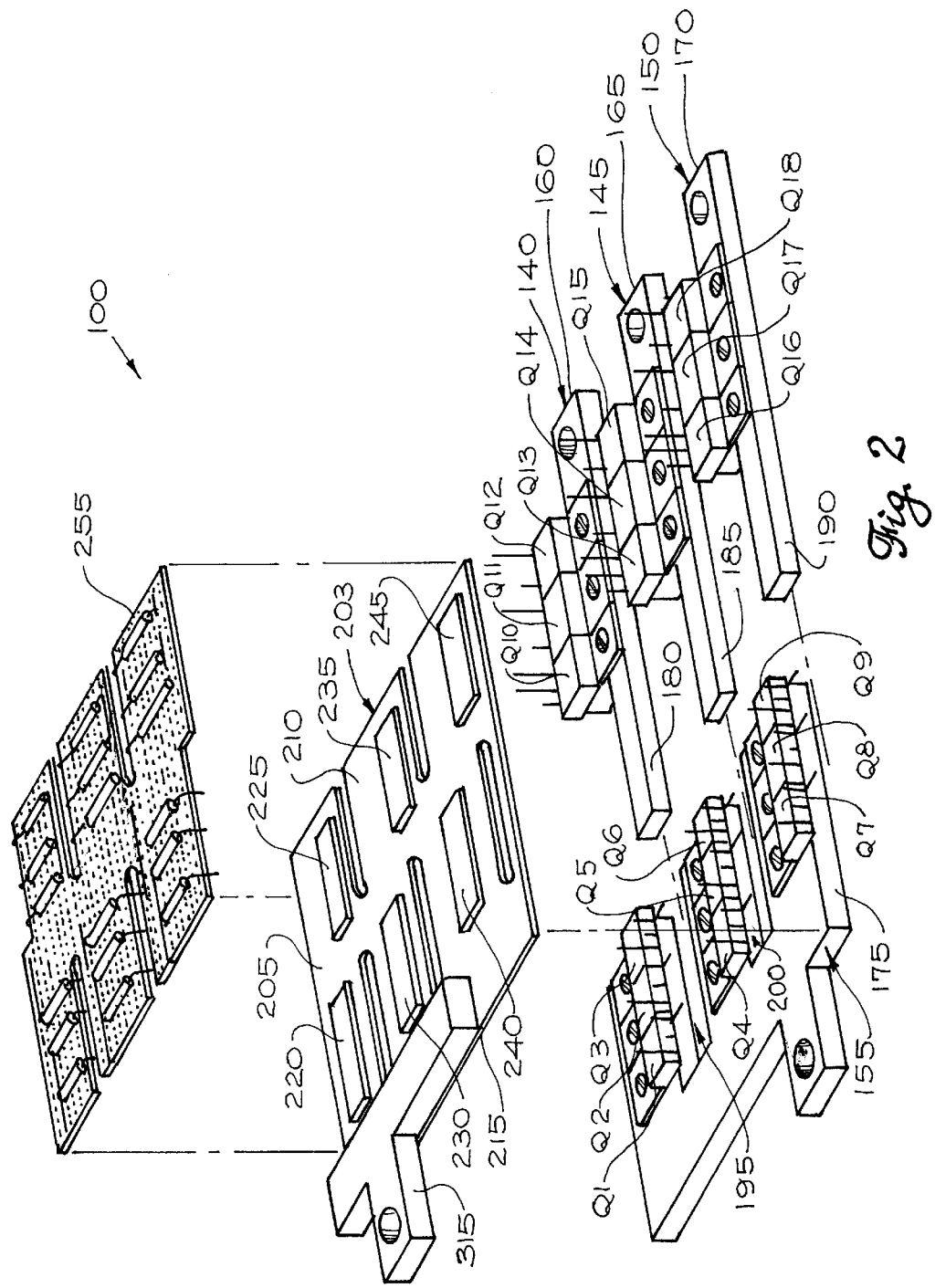
FIG. 2 is an exploded view of the three-phase H-bridge assembly shown in FIG. 1.

A bridge assembly is shown in FIG. 1 and is shown in an exploded view in FIG. 2. The bridge assembly is a three-phase H-bridge assembly 100 and includes a three-phase H-bridge circuit 105 that is controlled by an inverter controller. The inverter controller controls the three-phase H-bridge circuit 105 to convert a DC signal to an AC signal or an AC signal to a DC signal. An exemplary H-bridge circuit is schematically represented in FIG. 4.

Figure 4:
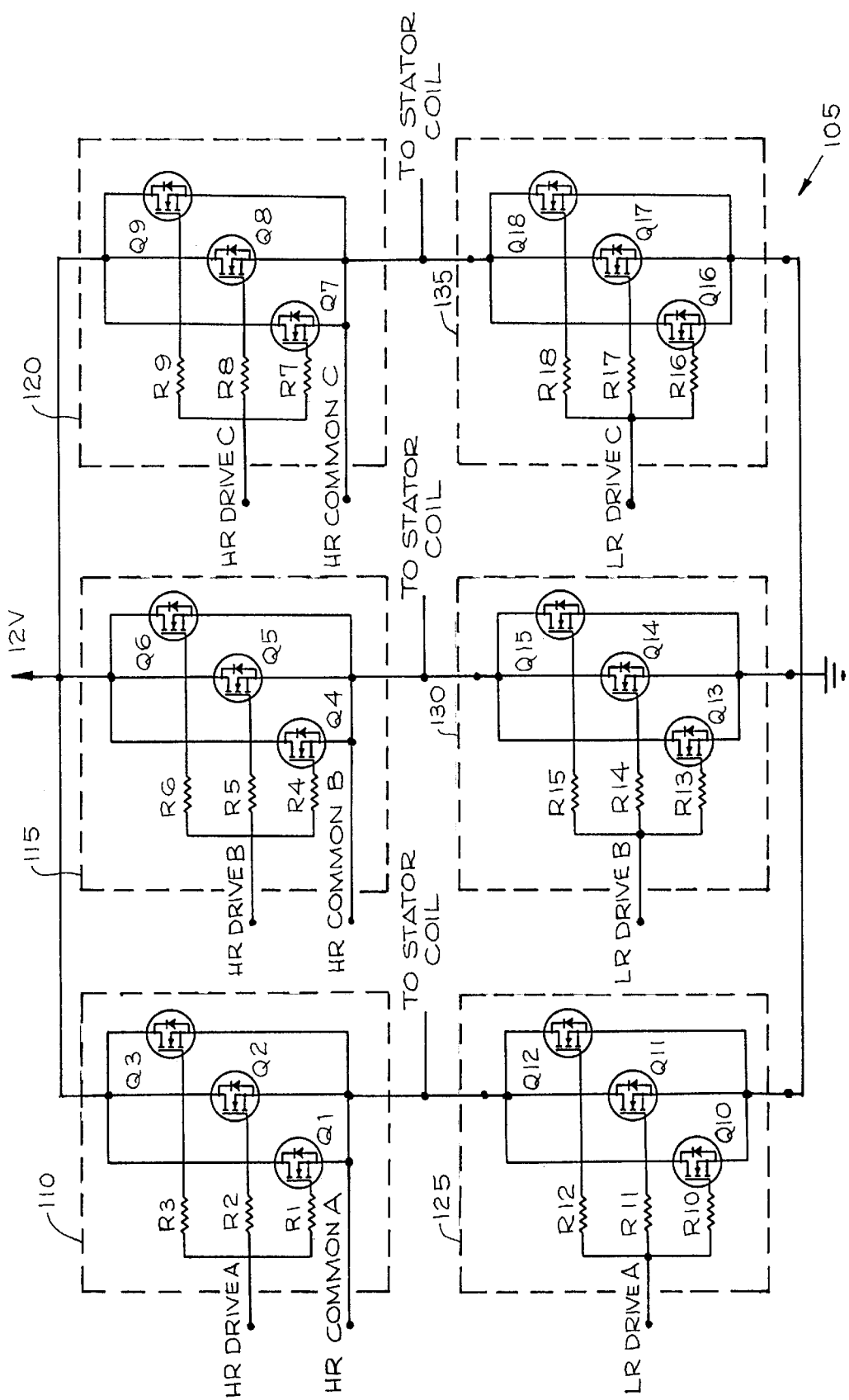
FIG. 4 is an electrical schematic of a three-phase H-bridge circuit according to the present invention.
Figure 5:
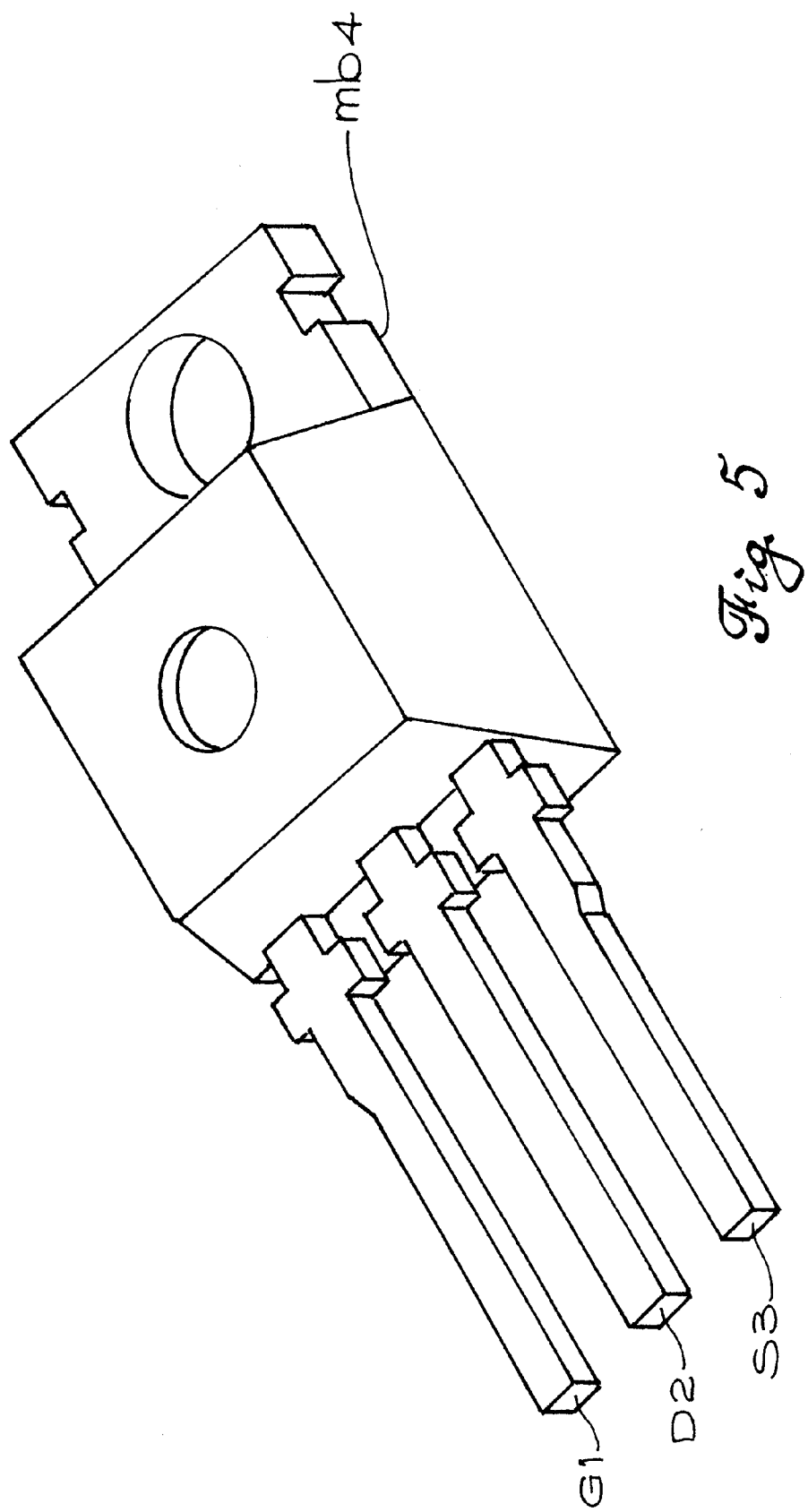
FIG. 5 is a perspective view of a switch device used in the three-phase H-bridge assembly.

With reference to FIG. 4, the three-phase H-bridge circuit 105 includes switching circuits 110, 115, 120, 125, 130, and 135. Since the switching circuits 110–135 are similar, only switching circuit 110 will be discussed in detail. Switching circuit 110 includes switching devices Q1, Q2 and Q3 and resistors R1, R2 and R3. The switching devices are preferably metal-oxide semiconductor field-effect transistors (MOSFETs) but, alternatively, may be any other switching device capable of being controlled by a drive signal. Other switching devices include, but are not limited to, relays and other transistors including field-effect transistors (FETs) or bi-polar junction transistors (BJTs). An exemplary MOSFET is an Infineon Technologies OptiMOS Power-Transistor, Model No. SPP80N03S2-03, which is shown in FIG. 5. The MOSFETs Q1–Q18 have a gate pin G1, a drain pin D2, a source pin S3 and a mounting base mb4. The mounting base mb4 also includes a drain connection for the MOSFETs Q1–Q18.

Referring back to FIG. 4, MOSFETs Q1, Q2, and Q3 are electrically connected in parallel. That is, the drain of each MOSFET Q1, Q2 and Q3 are electrically connected and the source of each MOSFET Q1, Q2 and Q3 are electrically connected. In addition, one end of resistors R1, R2 and R3 are connected to the respective gate of each MOSFET Q1, Q2 and Q3, and the other end of resistors R1, R2 and R3 are electrically connected together. Therefore, MOSFETs Q1, Q2 and Q3 are connected in parallel such that when a high voltage signal (e.g., five volts) is applied to the high-rail drive (HR Drive A) current flows from each MOSFET's drain to each MOSFET's source.

Although switching circuit 110 includes three switching devices Q1, Q2 and Q3, any number of switching devices may be used including only one switching device. Multiple switching devices allow more current flow through the three-phase H-bridge circuit 105. For example, if a MOSFET has a current rating of 80 amps and three MOSFETs are connected in parallel, then the switching circuit has a current rating of 240 amps. Thus, the number of switching devices used for the three-phase H-bridge assembly is dictated in part on the required current rating for the three-phase H-bridge assembly 100 and the current rating for the switching devices. However, one of the drawbacks for increasing the current rating for the three-phase H-bridge assembly 100 is that the heat generated by the three-phase H-bridge assembly 100 also increases. Consequently, the three-phase H-bridge assembly 100 is required to dissipate a greater amount of heat.

With reference to FIG. 2, the three-phase H-bridge assembly includes first, second, third and fourth subassemblies 140, 145, 150, and 155. The first subassembly 140 includes MOSFETs Q10, Q11, and Q12 interconnected with a first terminal plate 160. The second subassembly 145 includes MOSFETs Q13, Q14, and Q15 interconnected with a second terminal plate 165. The third subassembly 150 includes MOSFETs Q16, Q17, and Q18 interconnected with a third terminal plate 170. The fourth subassembly 155 includes MOSFETs Q1–Q9 interconnected with a bus terminal plate 175. The term "interconnected" means that one element is either connected directly or indirectly to another element or is in mechanical communication with another element. Examples include directly securing one element to another (e.g., via welding, bolting, gluing, mating, etc.).

Each terminal plate 160, 165, 170 or 175 is preferably made of aluminum and has a thickness of approximately 8 mm. However, the terminal plates 160, 165, 170 or 175 may be made of other metals (e.g., copper) and the thickness may vary depending on the amount of heat needing to be dissipated. It is also envisioned that if other switching devices are used, then the switching devices may be interconnected with the terminal plates in other configurations than in the embodiment shown. For example, all of the switching devices may be interconnected with the bus terminal plate 175 with the first, second and third subassemblies 140, 145 and 150 each including an additional element to be used for interconnecting with a fastener (discussed below).

The first, second, third and bus terminal plates 160, 165, 170 and 175 are electrically isolated from each other and each includes a terminal T1, T2, T3 and T4 (FIG. 1), respectively. For the embodiment shown, terminals T1, T2 and T3 receive a screw or a similar device, and allow for interconnecting with the windings of a three-phase motor. The terminal T4 receives a screw or a similar device, and allows for interconnecting with a positive terminal of a battery. The first, second and third terminal plates 160, 165 and 170 each include an extension or finger 180, 185 and 190, respectively. The finger 180 allows for easier electrical connection to the source pin S3 of MOSFETs Q1, Q2 and Q3, the finger 185 allows for easier electrical connection to the source pin S3 of MOSFETs Q4, Q5 and Q6, and the finger 190 allows for easier electrical connection to source pin S3 of MOSFETs Q7, Q8 and Q9 (discussed below). The bus terminal plate 175 includes recessed areas 195 and 200 for reception of fingers 180 and 185.

The three-phase H-bridge assembly 100 further includes a fifth subassembly 203 having a bus board 205. The bus board 205 is preferably a one-sided copper clad printed circuit board having a conductive side or surface 210 and a nonconductive side or surface 215 opposite the conductive surface 210. The conductive surface 210 acts as a ground plane board or bus and includes a terminal T5 (FIG. 1). The terminal T5 receives a screw or a similar device, and allows for interconnecting with the negative terminal of the battery. In another embodiment, the bus board is implemented by two boards: a conductive board and a non-conductive board. In yet another embodiment, the bus board may be a single conductive metal material or board with one or more nonconductive materials separating the MOSFETs Q1–Q18 from the metal board. The bus board 205 is interconnected to each subassembly 140, 145, 150 and 155. One or more fasteners 208 (FIG. 3) retain the subassemblies 140, 145, 150,155 and 203. For the embodiment shown, the one or more fasteners 208 are an epoxy or glue. Of course other fasteners may be used, such as bolts, rivets or clamps.

The three-phase H-bridge assembly 100 further includes insulators 220, 225, 230, 235, 240, and 245 (FIG. 2). The insulators 220–245 provide insulation between the conductive plane 210 of the bus board 205 and the resistors R1–R18 connected in circuit. In alternative embodiments, the three-phase H-bridge assembly may include one insulator formed to provide insulation or any number of insulators formed to provide insulation. Even further, depending on how the bus board 205 or the resistor board (discussed below) is formed, no insulators 220–245 may be required.

The three-phase H-bridge assembly 100 further includes a resistor board 255 used for connecting resistors R1–R18 in circuit. In alternative embodiments, the resistor board 255 can be an integrated circuit board incorporating resistors R1–R18 or may not be required at all.

Figure 3:
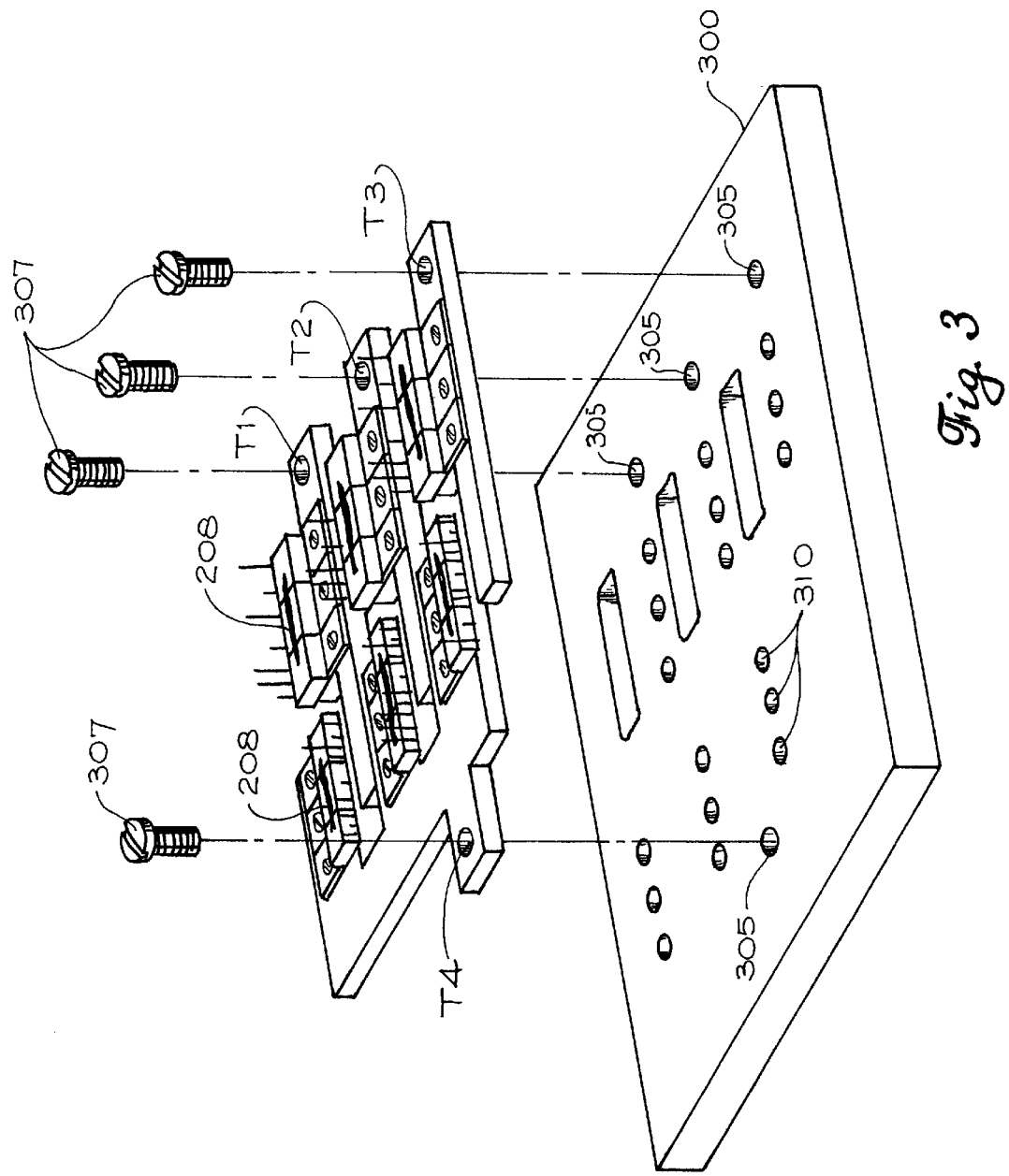
FIG. 3 is a partial exploded view of the three-phase H-bridge assembly shown in FIG. 1.

For assembly of the H-bridge assembly 100 and with reference to FIG. 3, the first, second, third and bus terminal plates 160, 165, 170, and 175 are temporarily mounted on a mounting structure or jig 300. The mounting structure 300 includes receptacles 305 and depressions 310. The plates 160, 165, 170 and 175 are preferably fixed to the mounting assembly by inserting mounting screws 307 into terminals T1, T2, T3 and T4, and receptacles 305, respectively. By temporarily securing the terminal plates 160, 165, 170 and 175 to the mounting structure 300, the subassemblies 140, 145, 150 and 155 will not move while the three-phase H-bridge assembly 100 is being assembled. The MOSFETs Q1–Q18 may be previously interconnected with plates 160, 165, 170 and 175 or may be coupled after the plates 160, 165, 170 and 175 are mounted to the mounting structure 300. An example method of interconnecting the MOSFETs Q1–Q18 to the mounting structure 300 is inserting a screw 315 through the mounting base mb4 of each MOSFET. If the MOSFETs are secured onto the mounting structure 300 after the plates have been secured, then the mounted structure 300 preferably includes depressions 310 for receiving the mounting screws. Of course, depending on the switching device used, the method of interconnecting the switching devices to the plates 160, 165, 170 and 175 may vary.

For the embodiment shown, MOSFETS Q1–Q9 are interconnected with the bus terminal plate 175, MOSFETs Q10–Q12 are interconnected with the first terminal plate 160, MOSFETs Q13–Q15 are interconnected with the second terminal plate 165, and MOSFETs Q16–Q18 are interconnected with the third terminal plate 170.

After interconnecting the MOSFETS Q1–Q18 to the terminal plates 160, 165, 170, 175, for MOSFETs Q1, Q2 and Q3, the source pins S3 are electrically connected to the finger 180 of the first terminal plate 160, the drain pins D2 are removed or cut-off, and the gate pins G1 extend upward for future connection to the resistors R1–R3, respectively. For MOSFET Q4, the source pin S3 is electrically connected to the finger 185 of the second terminal plate 165, the drain pin D2 extends upward for later connection to the controller, and the gate pin G1 extends upward for future connection to the resistor R4. For MOSFET Q5 and Q6, the source pins S3 are electrically connected to the finger 185 of the second terminal plate 165, the drain pins D2 are removed or cut-off, and the gate pin G1 extends upward for future connection to the resistor R5 and R6 respectively. For MOSFETs Q7, Q8 and Q9, the source pins S3 are electrically connected to the finger 190 of the third terminal plate 170, the drain pins D2 are removed or cut-off, and the gate pins G1 extend upward for future connection to the resistors R7, R8 and R9, respectively. For MOSFET Q10, the source pin S3 extends upward for future assembly to the ground plane board 210, the drain pin extends upward to be connected to the inverter controller, and the gate pin G1 extends upward for future assembly to the resistor R10. For MOSFETs Q11 and Q12, the source pins S3 extend upward for future assembly to the ground plane board 210, the drain pins D1 are removed or cut-off, and the gate pins G1 extend upward for future assembly to the resistors R11 and R12, respectively. For MOSFET Q13, the source pin S3 extends upward for future assembly to the ground plane board 210, the drain pin extends upward to be connected to the inverter controller, and the gate pin G1 extends upward for future assembly to the resistor R13. For MOSFETs Q14 and Q15, the source pins S3 extend upward for future assembly to the ground plane board 210, the drain pins D1 are removed or cut-off, and the gate pins G1 extend upward for future assembly to the resistors R13 and R14, respectively. For MOSFET Q16, the source pin S3 extends upward for future assembly to the ground plane board 210, the drain pin D1 extends upward to be connected to the inverter controller, and the gate pin G1 extends upward for future assembly to the resistor R16. For MOSFETs Q17 and Q18, the source pins S3 extend upward for future assembly to the ground plane board 210, the drain pins D1 are removed or cut-off, and the gate pins G1 extend upward for future assembly to the resistors R17 and R18, respectively.

Since each MOSFET Q1–Q18 contains a mounting base mb4 that includes a drain, the drain of each MOSFET Q1–Q18 is electrically connected to the respective terminal plate 160, 165, 170 or 175. However, for other switching devices or other MOSFETs, the drain or second connector may need to be electrically connected to the appropriate terminal plate 160, 165, 170 or 175.

After the first, second, third and fourth subassemblies 140, 145, 150 and 155 are mounted on the mounting structure 300 and the MOSFETs Q1–Q18 are mounted to the first, second, third and bus terminal plates 160, 165, 170 and 175, the bus board 205 of the fifth subassembly 203 is interconnected to the subassemblies 140, 145, 150 and 155. Preferably, the bus board 205 includes a conductive side or surface 210 and a nonconductive side or surface 215 and holes for wires to extend through (see FIG. 2). One method of interconnecting the bus board 205 to the subassemblies includes spreading epoxy or glue 208 onto the MOSFETs Q1–Q18 and placing the nonconductive side 215 of the bus board 205 to the MOSFETs Q1–Q18. Once the glue has dried, the glue fixes the subassemblies 140, 145, 150 and 155 to the bus board 205 resulting in a substantially rigid structure. Of course, other methods may be used for fastening the subassemblies together.

After the bus board 205 is secured, the source of each MOSFET Q1O–Q18 is electrically connected to the conductive side 210 of the bus board 205. In addition, a terminal 315 is attached by solder to the conductive side 210 of the bus board 205. Of course, the terminal 315 may have been previously soldered to the conductive plane 210 prior to mounting the bus board 205 to the grounding device. Additionally, depending on the fastener used and if the conductive and nonconductive planes are separate, the method of coupling the bus board 205 may vary.

After interconnecting the bus board 205 to the subassemblies 140, 145, 150 and 155, the resistors R1–R18 are connected in circuit with the MOSFETs Q1–Q18. To promote the connections, the resistors R1–R18 may be mounted on the mounting board 255. The resistors R1–R18 are connected as is electrically shown in the electrical schematic in FIG. 4. Upon completion of the wiring, the three-phase H-bridge assembly 100 is complete. The three-phase H-bridge assembly 100 is then connected to the inverter controller resulting in an inverter and/or rectifier.

As can be seen from the above, the present invention provides a three-phase H-bridge assembly and method of assembling the three-phase H-bridge assembly. Various features and advantages of the invention are set forth in the following claims.

What is claimed is:

1. A bridge assembly for a three-phase motor, comprising:
   a first subassembly including a first terminal plate, a second subassembly including a second terminal plate, a third subassembly including a third terminal plate and a fourth subassembly including a bus terminal plate, each of the terminal plates being electrically isolated from the other terminal plates, and at least one of the first, second, third and bus terminal plates acting as a heat sink; and
   first, second, third, fourth, fifth and sixth switching devices interconnected to at least one of the terminal plates, each switching device having a heat-generating surface in thermal communication with one of the first, second, third and bus terminal plates; and
   a fifth subassembly interconnected with the first, second, third and fourth subassemblies, the fifth subassembly having a bus board.

2. A bridge assembly as in claim 1, further comprising:
   six resistors connected in circuit resulting in a bridge circuit.

3. A bridge assembly as in claim 1, wherein the first subassembly includes the first switching device interconnected with the first terminal plate, the second subassembly includes the second switching device interconnected with the second terminal plate, the third subassembly includes the third switching device interconnected with the third terminal plate, and the fourth subassembly includes the fourth switching device interconnected with the bus terminal plate.

4. A bridge assembly as in claim 3, wherein the fourth subassembly includes the fifth and sixth switching devices interconnected with the bus terminal plate.

5. A bridge assembly as in claim 4, wherein the first subassembly further includes a seventh switching device interconnected with the first terminal plate, the second subassembly further includes an eight switching device interconnected with the second terminal plate, the third subassembly further includes a ninth switching device interconnected with the third terminal plate, and the fourth subassembly further includes tenth, eleventh and twelfth switching devices interconnected with the bus terminal plate, wherein each switching device has a heat generating surface, and wherein each terminal plate acts as a heat sink.

6. A bridge assembly as in claim 5, wherein the first and seventh switching devices are electrically connected in parallel, wherein the second and eighth switching devices are electrically connected in parallel, wherein the third and ninth switching devices are electrically connected in parallel, wherein the fourth and tenth switching devices are electrically connected in parallel, wherein the fifth and eleventh switching devices are electrically connected in parallel, and wherein the sixth and twelfth switching devices are electrically connected in parallel.

7. A bridge assembly as in claim 3, wherein the first, second, third and fourth subassemblies are interconnected with the fifth subassembly by a fastener.

8. A bridge assembly as in claim 1, wherein the bus board includes a one-sided copper clad printed circuit board.

9. A bridge assembly as in claim 1, wherein each subassembly includes a terminal.

10. A bridge assembly as in claim 1, wherein the bus board includes a conducting surface.

11. A bridge assembly as in claim 10, wherein the bus board includes a nonconductive surface disposed next to each switching device.

12. A bridge assembly as in claim 1, wherein each of the first, second, third and bus terminal plates act as a heat sink.

13. A bridge assembly as in claim 12, wherein the first, second, third and bus terminal plates are thermally isolated.

14. A bridge assembly as in claim 1, wherein the switching devices include transistors.

15. A bridge assembly as in claim 14, wherein the transistors are field-effect transistors.

16. A method of assembling a bridge circuit for a three-phase motor, comprising:
   forming first, second, third and fourth subassemblies, the first subassembly including a first terminal plate, the second subassembly including a second terminal plate, the third subassembly including a third terminal plate, and the fourth subassembly including a bus terminal plate, at least one of the terminal plates acting as a heat sink, the forming step including
   interconnecting a first switching device to one of the first, second, third, and bus terminal plates,
   interconnecting a second switching device to one of the first, second, third, and bus terminal plates,
   interconnecting a third switching device to one of the first, second, third, and bus terminal plates,
   interconnecting a fourth switching device to one of the first, second, third, and bus terminal plates, interconnecting a fifth switching device to one of the first, second, third, and bus terminal plates, interconnecting a sixth switching device to one of the first, second, third, and bus terminal plates; and interconnecting the first, second, third and fourth subassemblies to a fifth subassembly.

17. A method as set forth in claim 16, further comprising:

temporarily mounting the first, second, third and bus terminal plates to a mounting structure, and removing the first, second, third and fourth terminals from the mounting structure after the step of interconnecting the first, second, third and fourth subassemblies with the fifth subassembly.

18. A method as set forth in claim 17, wherein the step of interconnecting the subassemblies includes interconnecting each switching device to the fifth subassembly with a fastener.

19. A method as set forth in claim 16, wherein the first switching device is interconnected with the first terminal plate, the second switching device is interconnected with the second terminal plate, the third switching device is interconnected with the third terminal plate, and the fourth, fifth and sixth switching devices are interconnected with the bus terminal plate.

20. A method as set forth in claim 19, wherein each switching devices includes a heat generating surface, wherein each terminal plate acts as a heat sink, and wherein the steps of interconnecting the switching devices includes the step of interconnecting the respective heat generating surface in thermal communication with the respective first, second, third and bus terminal plate.

21. A method as set forth in claim 19, further comprising:

connecting six resistors in circuit resulting in a bridge circuit.

22. A method as set forth in claim 19, wherein the forming step further includes:

interconnecting a seventh switching device to the first terminal plate;

interconnecting an eighth witching device to the second terminal plate;

interconnecting a ninth switching device to the third terminal plate; and interconnecting tenth, eleventh and twelfth switching device to the bus terminal plate.

23. A method as set forth in claim 22, wherein the forming step further includes:

connecting the first and seventh switching devices in parallel;

connecting the second and eighth switching devices in parallel;

connecting the third and ninth switching devices in parallel;

connecting the fourth and tenth switching devices in parallel;

connecting the fifth and eleventh switching devices in parallel; and connecting the sixth and twelfth switching devices in parallel.

24. A method as set forth in claim 16, wherein each switching device includes a transistor.

25. A method as set forth in claim 24, wherein the transistor is a field-effect transistor.

26. A method as set forth in claim 24, wherein each switching device includes a field-effect transistor (FET) having a source, a drain and a gate, and wherein the method comprises:

electrically connecting the drain of each switching device to the respective terminal plate;

electrically connecting the source of the fourth transistor to the first terminal plate;

electrically connecting the source of the fifth transistor to the second terminal plate;

electrically connecting the source of the and sixth transistor to the third terminal plate; and electrically connecting the source of the first, second and third transistors to a bus board of the fifth subassembly.

27. A method as set forth in claim 26, wherein the bus board includes a conductive surface.

28. A method as set forth in claim 16, further comprising creating a fifth subassembly by interconnecting a terminal to a bus board.

29. A method as set forth in claim 28, wherein the bus board includes a one-sided copper clad printed circuit board.

* * * * *